(12) United States Patent
Mendiola

(10) Patent No.: US 8,874,073 B2
(45) Date of Patent: Oct. 28, 2014

(54) SYSTEM AND METHOD FOR ADJUSTING THE AMOUNT OF DATA BANDWIDTH PROVIDED TO A MOBILE DEVICE

(75) Inventor: Dennis Mendiola, New York, NY (US)

(73) Assignee: Chikka Pte Ltd., Singapore (SG)

( * ) Notice: Subject to any disclaimer, the term of this patent is extended or adjusted under 35 U.S.C. 154(b) by 0 days.

(21) Appl. No.: 13/537,369

(22) Filed: Jun. 29, 2012

(65) Prior Publication Data

US 2013/0023232 A1    Jan. 24, 2013

Related U.S. Application Data

(60) Provisional application No. 61/502,462, filed on Jun. 29, 2011.

(30) Foreign Application Priority Data

Nov. 24, 2011   (SG) ................................ 201108719-4

(51) Int. Cl.
*H04M 11/00*   (2006.01)
*H04W 4/00*   (2009.01)
(Continued)

(52) U.S. Cl.
CPC .............. *H04W 28/20* (2013.01); *H04M 17/02* (2013.01); *H04M 15/81* (2013.01);
(Continued)

(58) Field of Classification Search
CPC ..... H04W 28/20; H04W 4/00; H04W 480/04; H04M 11/00; H04M 3/00; H04L 47/10; H04L 67/06; H04L 67/02

USPC ........ 455/414.1, 406, 404.1, 418, 450, 452.2; 370/252, 401, 335, 329, 444, 310, 254, 370/328

See application file for complete search history.

(56) References Cited

U.S. PATENT DOCUMENTS

| 7,116,682 B1 | 10/2006 | Waclawsky et al. |
| 2005/0113062 A1 | 5/2005 | Pelaez et al. |

(Continued)

OTHER PUBLICATIONS

PCT International Search Report and Written Opinion for Intl. Appl. No. PCT/SG2012/000230, date mailed Sep. 12, 2012, pp. 1-9.

(Continued)

*Primary Examiner* — Kiet Doan
(74) *Attorney, Agent, or Firm* — MKG, LLC

(57) ABSTRACT

The invention provides a system for adjusting the amount of data bandwidth provided to a mobile device comprising a bandwidth adjustment facilitator arranged to receive a request from the mobile device for adjusting the amount of data bandwidth; a bandwidth throttler in communication with the bandwidth adjustment facilitator; the bandwidth throttler adapted to cap or allocate excess available data bandwidth to the mobile device; wherein on receipt of the request, the bandwidth adjustment facilitator process the request and if the request is successfully processed, adjusts the data bandwidth provided to the mobile device via the bandwidth throttler. The system may further be adapted for billing/charging based on either pay-per-specified-time model or pay per action model.
The invention is conveniently suited for use in telecommunications system and does not require modifications to be made to existing telecommunications system.

25 Claims, 3 Drawing Sheets

(51) Int. Cl.
    H04M 17/02    (2006.01)
    H04M 15/00    (2006.01)
    H04L 12/14    (2006.01)
    H04M 17/00    (2006.01)
    H04W 28/20    (2009.01)
    H04W 4/24     (2009.01)
    H04W 4/12     (2009.01)
(52) U.S. Cl.
    CPC ......... *H04L 12/1432* (2013.01); *H04M 17/20* (2013.01); *H04L 12/1485* (2013.01); *H04M 15/8027* (2013.01); *H04M 15/43* (2013.01); *H04M 15/745* (2013.01); *H04M 15/82* (2013.01); *H04M 15/70* (2013.01); *H04W 4/12* (2013.01); *H04M 15/52* (2013.01); *H04M 15/80* (2013.01); *H04W 4/24* (2013.01); *H04M 15/72* (2013.01)
    USPC ........................................................ 455/406

(56) References Cited

U.S. PATENT DOCUMENTS

| | | | |
|---|---|---|---|
| 2009/0163183 A1* | 6/2009 | O'Donoghue et al. | 455/414.1 |
| 2011/0038345 A1* | 2/2011 | Liu et al. | 370/330 |
| 2011/0106946 A1* | 5/2011 | Bao et al. | 709/225 |

OTHER PUBLICATIONS

PCT Notification of Transmittal of International Preliminary Report on Patentability for Intl. Appl. No. PCT/SG2012/000230, date mailed Sep. 28, 2013, pp. 1-6.

* cited by examiner

SYSTEM AND METHOD FOR ADJUSTING THE AMOUNT OF DATA BANDWIDTH PROVIDED TO A MOBILE DEVICE

FIELD OF THE INVENTION

The present invention relates to a system and method for adjusting the amount of data bandwidth provided to a mobile device. The system and method are particularly suited, but not limited to adjust data bandwidth for a mobile device having a pre-paid subscriber account with a telecommunications carrier and will be described in this context.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Mobile devices such as smartphones have recently surpassed the conventional desktop or laptop PCs as a popular means for people to connect to the internet, to connect with one another, and/or play online games. This in part is fueled by social networks and mobile software applications. The main advantage of mobile phones is in their ability to be "Always On" or connected to the Internet wherever the user is. Mobile phone users may receive and/or respond to Instant messaging messages, "Facebook™" tags, "Tweets™" instantly in real time wherever the users are, as long as data cellular connection (GSM, GPRS, 3G, LTE, 4G etc.) can be established.

The above advantage of mobile phone complements markets where majority of telecommunication carrier subscribers prefer mobile data post-paid plans. Subscribers of these post-paid plans generally do not mind paying more per month to have unlimited Internet data access or a data usage capped at a relatively larger size, for example 12 Gigabytes (GB).

However, providing "always on" Internet or data connection has remained a challenge for telecommunications carriers in markets dominated by users who prefer "prepaid plans" (or "pay-as-you-go" plans). In these markets, users are less willing to pay a relatively larger subscription fee for internet access. A typical prepaid plan is based on a pay-per-specified-time model, such as 10 pesos for 30 minutes of fast Internet connection. Another variation to the pay-per-specified time model may be a daily "always on" access to only social networking sites such as Facebook™ or Twitter™ for 20 pesos per day.

As cost is generally an important concern for prepaid plan users, a challenge for telecommunications carriers is to deliver Internet connection at relatively lower "sachet" price points, such as below 20 pesos daily—yet still providing prepaid plan users an "always on" experience, i.e. internet on demand. While this may be possible for certain phones which are efficient in terms of consuming data bandwidth, it is typically difficult to implement such "sachet" price points for more recent smartphones models which require relatively higher data bandwidth. There is thus a need to capture the market of these smartphone users by providing them with certain flexibility in controlling and adjusting their data bandwidth usage so as to implement such "sachet" price points.

Although it is possible for prepaid plan users to control data bandwidth and monitor their bandwidth usage, known control mechanisms in place are "all or nothing" approaches, i.e. data access may only be switched from either "all"—maximum data bandwidth, or "nothing"—no data bandwidth. The user does not have the flexibility in controlling different levels of data bandwidth as and when he/she desires, depending on his/her usage.

The present invention seeks to provide a system and method that alleviates the above mentioned drawbacks at least in part.

SUMMARY

In accordance with a first aspect of the present invention, there is provided a system for adjusting the amount of data bandwidth provided to a mobile device comprising a bandwidth adjustment facilitator arranged to receive a request from the mobile device for adjusting the amount of data bandwidth; a bandwidth throttler in communication with the bandwidth adjustment facilitator; the bandwidth throttler adapted to cap or allocate excess available data bandwidth to the mobile device; wherein on receipt of the request, the bandwidth adjustment facilitator process the request and if the request is successfully processed, adjusts the data bandwidth provided to the mobile device via the bandwidth throttler.

Preferably the request for adjusting the amount of data bandwidth is in the form of one of the following: Short Messaging Service (SMS) message; electronic text message; Unstructured Supplementary Service Data (USSD) message.

Preferably the data bandwidth is adjustable between two modes comprising a trickle mode where data bandwidth is 9.6 kbps and lower; and a boost mode where data bandwidth is at least 2 Mbps.

Preferably, the system further comprises a subscriber database arranged to maintain details of a plurality of subscribers; and an accounting database arranged to be in data communication with the subscriber database for the settlement and checking of available funds for each subscriber and maintaining a history of transaction of each subscriber.

Preferably, the default mode for a pre-paid subscriber is the trickle mode.

Preferably, the mobile device is arranged to send the request automatically to the bandwidth adjustment facilitator based on the usage profile of the mobile device.

Where the bandwidth adjustment facilitator is arranged to monitor the usage profile of the mobile device, the bandwidth adjustment facilitator is adapted to send a prompt to the mobile device, prompting the user of the mobile device if he would wish to adjust the data bandwidth according to the usage profile.

The usage profile used to determine if the data bandwidth should be adjusted to boost mode is based on one or more of the following:—detection that the mobile device has consumed the maximum data bandwidth of the trickle mode for a predetermined period of time; detecting that an active connection is established with a URL/IP address that is known to deliver video, images, or large files for a predetermined period of time; detecting that a file of a certain type and size is being accessed or downloaded; and detecting that the mobile device uses progressive http download.

Preferably, the bandwidth adjustment facilitator is arranged to check the access point name (APN) of the mobile device prior to processing the request.

Preferably, the bandwidth usage is charged or billed based on either a pay per-specific time model or pay per action model.

More preferably, the pay-per-specific time model or pay per action model is activated by sending a request from the mobile device to the bandwidth adjustment facilitator, the bandwidth adjustment facilitator operable to, upon receiving the request, toggle between an existing billing infrastructure implementing the pay-per-specific time model and an independent billing module implementing the pay per action model. In this case, the toggling from the existing billing infrastructure to the independent billing module may be achieved either by switching off the existing billing infrastructure; or defining the data bandwidth connection as a zero tariff.

In accordance with a second aspect of the present invention there is provided a method for adjusting the amount of data bandwidth provided to a mobile device comprising the following steps:—a. receiving at a bandwidth adjustment facilitator from the mobile device a request to adjust bandwidth; b. processing the request to adjust bandwidth; and c. adjusting the data bandwidth to the mobile device via a bandwidth throttler upon successful processing of the request.

Preferably, the request for adjusting the amount of data bandwidth is in the form of one of the following: Short Messaging Service (SMS) message; electronic text message; Unstructured Supplementary Service Data (USSD) message.

Preferably the bandwidth is adjustable between two modes comprising a trickle mode where data bandwidth is 9.6 kbps and lower; and a boost mode where data bandwidth is at least 2 Mbps.

Preferably the processing step includes checking a subscriber database to determine if the mobile device has a subscriber account and the subscriber type (pre-paid or post-paid); and checking an accounting database for available of funds to make the adjustment of bandwidth.

Preferably the default mode of a pre-paid subscriber is the trickle mode.

Preferably the request is sent automatically to the bandwidth adjustment facilitator based on the usage profile of the mobile device.

Preferably the bandwidth adjustment facilitator is arranged to monitor the usage profile of the mobile device and sends a prompt to the mobile device to adjust the data bandwidth to boost mode according to the usage profile.

The usage profile used to determine if the data bandwidth should be adjusted to boost mode is based on one or more of the following:—whether the mobile device consumed the maximum data bandwidth of the trickle mode for a predetermined period of time; detecting that an active connection is established with a URL/IP address that is known to deliver video, images, or large files for a predetermined period of time; detecting that a file of a certain type and size is being accessed or downloaded; and detecting that the mobile device uses progressive http download.

Preferably the method includes a step of checking the access point name (APN) of the mobile device prior to processing the request.

Preferably the method comprising an additional step of billing for the bandwidth consumed based on either a pay-per-specific time model or pay per action model.

More preferably the pay-per-specific time model or pay per action model is activated by sending a request from the mobile device to the bandwidth adjustment facilitator, the bandwidth adjustment facilitator operable to, upon receiving the request, toggle between an existing billing infrastructure implementing the pay-per-specific time model and an independent billing module implementing the pay per action model. In this case the toggling from the existing billing infrastructure to the independent billing module may be achieved either by switching off the existing billing infrastructure; or defining the data bandwidth connection as a zero tariff.

In accordance with a third aspect of the present invention there is a mobile device containing software instructions, wherein upon execution of the software instructions performs the any of the method of the second aspect to adjust the data bandwidth.

Preferably, the software instructions include instructions to monitor the user profile.

In accordance with a fourth aspect of the present invention there is a mobile device containing software instructions to send a request for selection of either the pay-per-specific time model or the pay per action model.

BRIEF DESCRIPTION OF THE DRAWINGS

The present invention will now be described, by way of example only, with reference to the accompanying drawings, in which.

Figure 1:
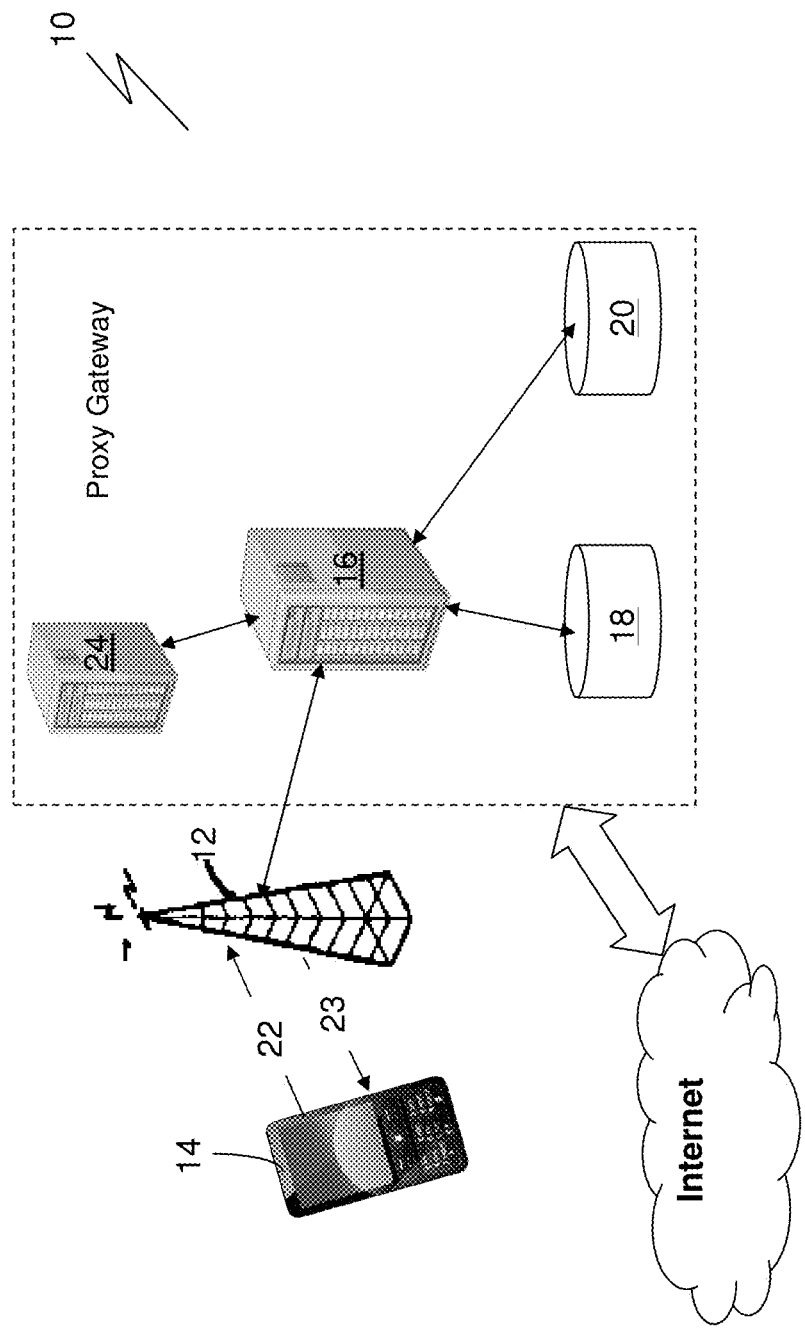
FIG. 1 is a schematic representation of a system for adjusting data bandwidth from a telecommunications network to at least one mobile device in accordance with an embodiment of the present invention.

Other arrangements of the invention are possible and, consequently, the accompanying drawings are not to be understood as superseding the generality of the preceding description of the invention.

DETAILED DESCRIPTION

In accordance with an embodiment of the present invention there is a system 10 for adjusting the amount of data bandwidth provided to a mobile device 14. The system 10 comprises a bandwidth adjustment facilitator 16 in communication with a bandwidth throttler 24; a subscriber database 18 and an accounting database 20. In the embodiment data bandwidth is provided to the mobile device 14 via a host such as telecommunications carrier 12.

The mobile device 14 is a smartphone capable of the installation of mobile software application or 'apps'. The mobile device 14 is connectable to the mobile data Internet via various mobile data services such as GPRS, Enhanced Data rates for GSM Evolution (EDGE), 3G, LTE, 4G etc.

The bandwidth adjustment facilitator 16 is adapted to process requests 22 from the user of mobile device 14 to the telecommunications network 12 for the adjustment of data bandwidth. In this sense, the bandwidth adjustment facilitator 16 is within a proxy gateway server for connecting to the Internet. The requests 22 are in the form of simple text or Short Messaging Service (SMS), Unstructured Supplementary Service Data (USSD) messages or any other form of an electronic signal/message wherein a software application is installed on the mobile device 14 for such a purpose.

The subscriber database 18 maintains details of the subscribers of telecommunications network 12, such as the Mobile Subscriber Integrated Services Digital Network Number (MSISDN) of each subscriber mobile phone. The subscriber database 18 is in data communication with the accounting database 20 for the settlement and checking of available funds for the subscriber of mobile device 14. The accounting database 20 further maintains a history of transaction of each subscriber.

For the case where the mobile Internet service is a GPRS service, the bandwidth adjustment facilitator 16 and the bandwidth throttler 24 are typically located between the Gateway GPRS Support Node (GGSN) and the Service Aware Support Node (SASN) of the GPRS core network.

The invention will now be described in the context of its intended use.

The mobile device 14 is installed with a dedicated mobile software application depending on the particular model of the mobile device 14. For a typical smartphone such as an iPhone™ or Android™, this may be an "app" as colloquially known. For ease of reference, the dedicated mobile software application will be interchangeably known as "Boost Apps".

Prior to use, the mobile device 14 is checked if it has been registered as a subscriber of the system 10 via checks on the MSISDN of the mobile device 14 or other methods as well known to a skilled person. If the mobile device 14 is a not a subscriber, the user of mobile device 14 is prompted a message by the software application to change the Access Point Name (APN) of the mobile device. An example of the message is as follows:—"To use the ABC Boost Apps, please change the APN of your smartphone to internet.abc.com".

If the mobile device 14 is already registered as a subscriber for the system 10, then there is no prompt to change the APN.

Alternatively, the telecommunications carrier 12 may have dedicated APNs for the purpose of carrying out the present invention and requires the user of the mobile device 14 to change the APN accordingly.

Any change in APN effectively changes the proxy internet gateway of the telecommunications carrier 12, thus directing internet data communication to be routed via the system 10.

The installed software application 30 may be manually activated by the user of mobile device 14 wherein the application opens a user interface (see FIG. 2) providing the option to adjust the bandwidth as desired, or may include a detecting algorithm for detecting the data usage profile of the subscriber for mobile device 14. The detecting algorithm will be discussed subsequently.

The mobile software application 30 next provides the user interface for the user of mobile device 14 to toggle control of his data speed between a 'trickle' mode—i.e. 9.6 kbps to 14.4 kbps and a 'boost' mode—2 Mbps onwards if on 3G for example, on demand. For the subscriber having a pre-paid contract or plan, the default mode for the data speed is the 'trickle' mode.

Upon clicking the button 'Boost' on the user interface, the request 22 to change the data speed from 'trickle' to '3G' or higher (depending on the limitation of the network) is sent to the bandwidth adjustment facilitator 16. The bandwidth adjustment facilitator 16 proceeds to process the request by verifying if the MSISDN of the mobile device 14 is in the subscriber database 18. Further steps such as password authentication, SMS verification may also be performed as known to a person skilled in the art to authenticate the subscriber.

Once the request 22 is successfully verified, the bandwidth adjustment facilitator 16 checks the accounting database 20 to make sure that the subscriber has enough funds to pay for the 'boost'.

Upon determining that there are enough funds in the subscriber pre-paid account or pre-paid card, the bandwidth adjustment facilitator 16 proceeds to adjust the bandwidth settings for the subscriber of mobile device 14. This is done via the bandwidth throttler 24, which either caps the data speed of connection between the mobile device 14 to the internet or allows any excess available data bandwidth to the mobile device 14.

As mentioned earlier, instead of manually activating the dedicated software application 30, the dedicated software application 30 installed on the mobile device 14 may include a detection algorithm for detecting the usage profile of the subscriber for mobile device 14. The detecting algorithm may also be installed on the bandwidth adjustment facilitator 16.

Figure 2:
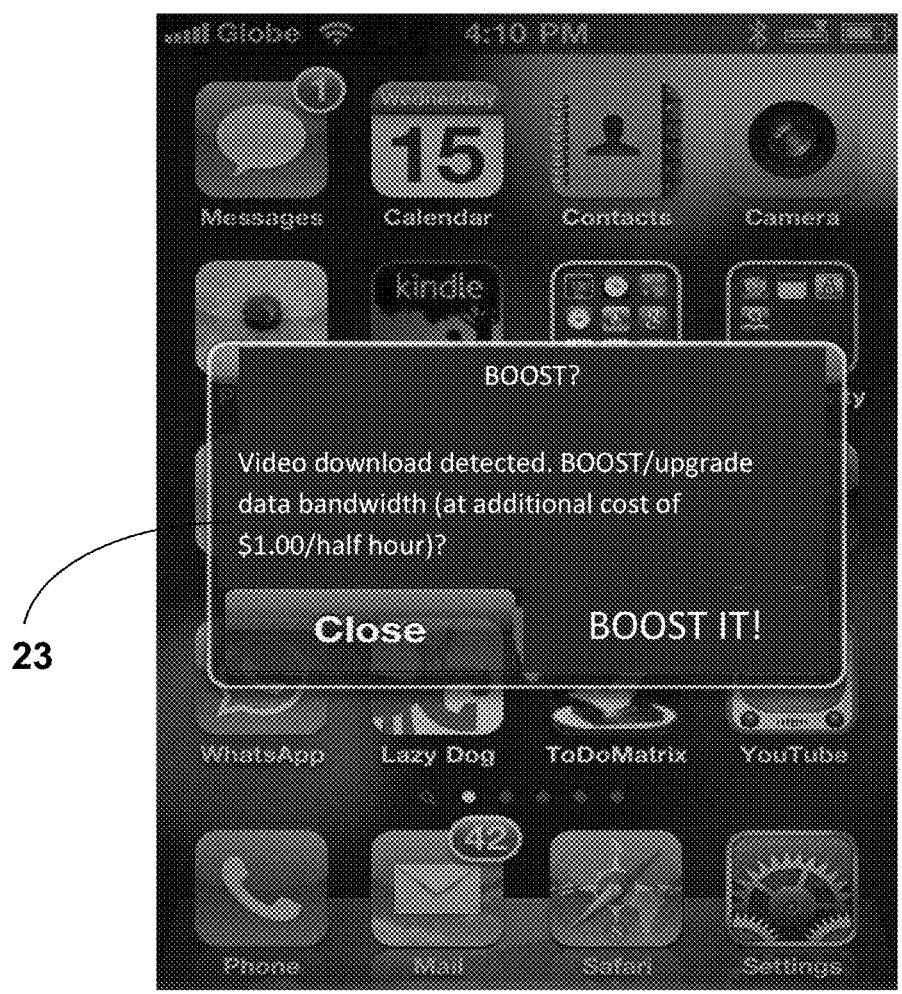
FIG. 2 illustrates a possible user interface for the system to automatically alert a user to adjust data bandwidth in accordance with an embodiment of the present invention.

Upon inferring from the detecting algorithm that the subscriber is likely to be downloading an image, watching a video, or accessing any large file including websites which are for example, image/graphic intensive; thus requiring more data bandwidth, the bandwidth adjustment facilitator 16 activates the dedicated software application to prompt an alert 23 to the user of mobile device 14 as shown in FIG. 2. The corresponding 'rules' for prompting an alert 23 to the user of mobile device 14 based on the results of the detecting algorithm may be one or more of the following:—

Detecting that the mobile device 14 consumed the maximum data bandwidth of the 'trickle' mode at 14.4 kbps for a period of time, for example 10 seconds indicates that the user is possibly trying to download an image or watch a video, and thus activating the app to prompt the alert to the user if he would like to BOOST his connection (for a fee);

Detecting that an active connection is established with a URL/IP address that is known to deliver video, pictures, or large files (e.g., www.facebook.com/video, www.youtube.com);

Detecting that a file of a certain type and size is being accessed or downloaded, such as files or URL ending with .RAR, .ZIP, .DOC, .DOCX, .RTF, .PPT, .ODP, .JPG, .BMP, PNG, .TIF, .PDF, .3GP, .AVI, .WMV, .M4V, . MPEG, .VOB, .MKV, .ASF, .M4V, .FLV, .MOV, .MP3, .AAC, .WAV, .WMA, .AU etc. which suggests that media file formats are being downloaded as opposed to pure text or light html images; and/or Detecting that the user uses 'progressive http download' as a method for downloading.

Where the Internet gateway servers will be able to detect how large a file is being downloaded or the type of file, thereby activating the dedicated software application to trigger an alert to 'boost' the internet data bandwidth.

Where the dedicated software application is installed on the mobile device 14, the request 22 is sent automatically to the bandwidth adjustment facilitator 16 to adjust the bandwidth once it is determined that one or more of the above rules are satisfied.

In each of these instances, the telecommunication carrier 12 informs the dedicated software application 30 for a possible "upsell to BOOST" alert or notification.

The described system and method further allows the user to stop or pause the 'boost' as and when desired, and thus better able to control the part of his remaining credit of the pre-paid plan.

Figure 3:
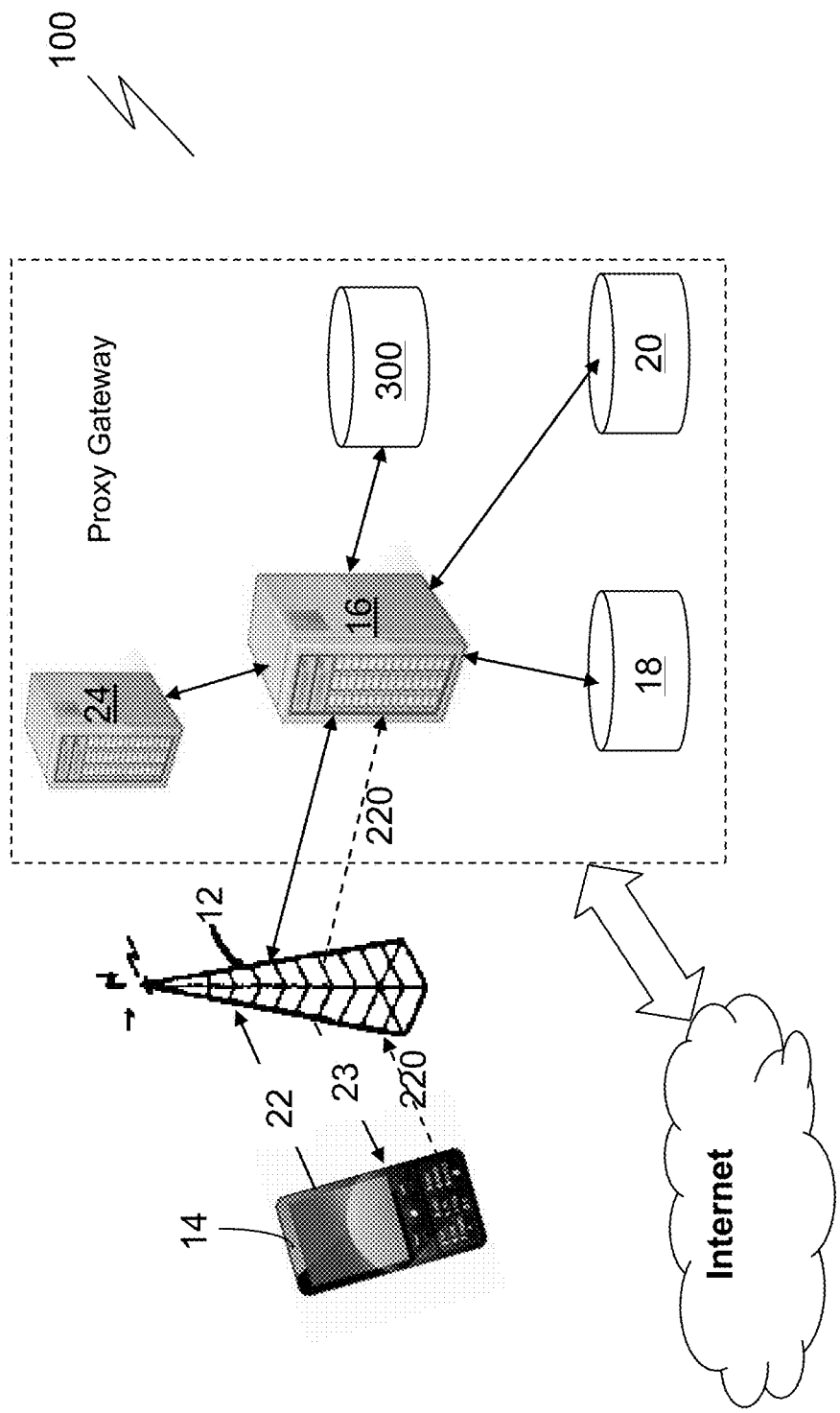
FIG. 3 is a schematic representation of a system for adjusting data bandwidth from a telecommunications network to at least one mobile device including an independent charging/billing module in accordance with another embodiment of the present invention.

In accordance with another embodiment of the present invention, as illustrated in FIG. 3, wherein like numerals reference like parts, there is a system 100 for adjusting the amount of data bandwidth provided to a mobile device 14. The system 100 comprises a bandwidth adjustment facilitator 16 in communication with a bandwidth throttler 24; a subscriber database 18 and an accounting database 20. Additionally, the system 100 further comprises a 'pay per action' based independent billing module 300. In this embodiment, the bandwidth adjustment facilitator 16 further maintains a list of different charging rates or plans and has a toggling mechanism to toggle from the existing billing structure to the pay per action independent billing module 300.

Independent billing module 300 is operable to be in data communication with the subscriber database 18 and accounting database 20. Independent billing module 300 is arranged to provide a 'per action charging' mechanism for charging/billing a subscriber for his Internet bandwidth usage. The independent billing module 300 is advantageous because it does not require modifications to the existing billing charging structure/database and may be implemented as a convenient 'add-on' to the existing resources.

'Per action charging' is a charging model based on an action taken by the subscriber. Examples of such action(s) are defined as follows:— i. Updating one's status on Facebook™ or other social networking sites including Tweeter etc;

ii. Viewing an up-to-10-minute video or 'flick' on Youtube™; In this regard, billing or charging occurs once for a full download and viewing, i.e. the bill/charge is the same regardless of how long the video takes to download or begins to stream. This is to be contrasted from the conventional 'pay-per-specified time' charging, where the subscriber/end-user is charged based on time taken for download;

iii. Uploading images/videos in social networking sites (Similar to the Youtube™ viewing example, the bill/charge to the user is the same regardless of how long it takes for a photo to upload or how big a file the upload entails.) and/or;

iv. Any other actions which the user, the application developer, or the telecommunications network service provider may define. This may include toll free downloads of mobile applications ("apps") but usage of these apps to perform subsequent functions (including i to iii above) may be chargeable on a per action basis.

In the context of the embodiment, other actions which may fall within the definition of 'per action charging' may include 'per click within dedicated smartphone 'App'; per click within web browser etc.

'Per action charging' offer additional choice for a pre-paid subscriber as it allows the pre-paid subscriber to choose from the conventional 'pay-per-specified time' model ('pay-per-specified time' mode such as 10 pesos for 30 minutes of Internet connection, and/or the daily "always on" access to only social networking sites such as Facebook™ or Twitter™ for 20 pesos daily) to the 'per action charging' model depending on his preference such as time, location and/or usage.

In this embodiment, the previously discussed 'Boost App' may include an additional function which allows a subscriber of mobile device 14 to toggle between the 'pay-per-specified action' charging/billing model to the 'per action charging' charging/billing model. Alternatively, the toggling function may be implemented as another dedicated software application or App.

The request 220 for switching to per action charging is in the form of simple text or Short Messaging Service (SMS), Unstructured Supplementary Service Data (USSD) messages or any other form of an electronic signal/message wherein a software application is installed on the mobile device 14 for such a purpose.

The embodiment with emphasis on the usage of the billing module 300 for charging/billing a subscriber's data bandwidth usage will next be described in the context of its use.

Upon detection that per action charging is to be adopted via a request 220 from the user of mobile device 14, the bandwidth adjustment facilitator 16 switches from the existing billing infrastructure of the telecommunications carrier 12 to the billing module 300. This may be achieved by either:— a. switching off the existing billing infrastructure; or b. defining the Internet connection as a zero tariff (equivalent to no charge on existing billing infrastructure).

The billing module 300 then takes over the billing/charging based on per action charging depending on the adjustment of bandwidth between the 'trickle mode' and 'boost mode' as previously discussed.

The billing module 300 is complementary with the flexible adjustment of data bandwidth. In particular, when a request 22 is sent to the bandwidth adjustment facilitator 16 to adjust the bandwidth from 'trickle' to 'boost' mode in conjunction with the request 220 to bill based on per action charging; the subscriber of mobile device 14 enjoys faster speed of accessing videos, files at almost the same charges using the per action charging model in comparison with the 'trickle' mode billed based on the per action charging model.

The system 100 may be suited to incorporate other permutations and combinations of usage. In particular, the billing module 300 may include differential pricing for accessing certain websites, URLs, Application Programming Interfaces (APIs) and IP addresses. Access to these mobile services will not incur any mobile data charges to the subscriber or will be at a discounted rate.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein. In particular, Minimum requirement of mobile device 14—connectable to the Internet. In event where the mobile device 14 is not able to support the dedicated software application 30, request 22 may be sent via simple SMS.

More than two modes of data bandwidth may be configured depending on the user's/subscribers' needs. For example, the 'trickle' mode (9.6 kbps and lower, good for notifications and text instant messages; the EDGE/GPRS mode of about maximum rate of 384 kbps, which is good for browsing, general Internet messaging, HTML pages browsing with images or pictures; and 3G mode up to speed about 2 Mbps and higher which is ideal for watching videos, doing 3G video calls etc.

An option allowing the user of mobile device 14 to toggle off or pause the boosting of bandwidth may also be adapted in the dedicated mobile software application. Such an option allows the user to have better control over his/her pre-paid credits.

As mentioned earlier, the dedicated mobile software application 30 may, if the user of mobile device 14 allows, go into an automatic mode where the dedicated software application automatically boost or un-boost the data bandwidth depending on likely actions taken by the user of mobile device 14 (e.g. passively waiting for push notifications or accessing 'heavy content' as based on the detection algorithm described earlier). In order to help the user be aware of the cost incurred, the user is notified in the background if he is in 'boost' mode and therefore incurring higher pre-paid credits. The automatic mode may be manually 'override' at any point of time by the user of mobile device 14.

In the system 100, in addition to the 'charge per action' billing method, a "flat fee for a defined set of web resources" method, or some combination of both may be adopted.

What is claimed is:

1. A system for adjusting an amount of data bandwidth provided to a mobile device comprising:

a bandwidth adjustment facilitator arranged to receive a request from the mobile device for adjusting the amount of data bandwidth; and a bandwidth throttler in communication with the bandwidth adjustment facilitator, the bandwidth throttler adapted to cap or allocate excess available data bandwidth to the mobile device;

wherein on receipt of the request, the bandwidth adjustment facilitator processes the request and if the request is successfully processed, adjusts the data bandwidth provided to the mobile device via the bandwidth throttler, the data bandwidth is adjustable between two modes comprising a trickle mode where data bandwidth is 9.6 kbps and lower; and a boost mode where data bandwidth is at least 2 Mbps.

2. The system according to claim 1, wherein the request for adjusting the amount of data bandwidth is Short Messaging Service (SMS) message, electronic text message, or Unstructured Supplementary Service Data (USSD) message.

3. The system according to claim 1 comprising a subscriber database arranged to maintain details of a plurality of subscribers; and an accounting database arranged to be in data communication with the subscriber database for settlement and checking of available funds for each subscriber and maintaining a history of transaction of each subscriber.

4. A system for adjusting an amount of data bandwidth provided to a mobile device comprising:
a bandwidth adjustment facilitator arranged to receive a request from the mobile device for adjusting the amount of data bandwidth; and
a bandwidth throttler in communication with the bandwidth adjustment facilitator, the bandwidth throttler adapted to cap or allocate excess available data bandwidth to the mobile device;
wherein on receipt of the request, the bandwidth adjustment facilitator processes the request and if the request is successfully processed, adjusts the data bandwidth provided to the mobile device via the bandwidth throttler, the data bandwidth is adjustable between two modes comprising a trickle mode where data bandwidth is 9.6 kbps and lower; and a boost mode where data bandwidth is at least 2 Mbps, wherein a default mode of a pre-paid subscriber is the trickle mode.

5. The system according to claim 1, wherein the mobile device is arranged to send the request automatically to the bandwidth adjustment facilitator based on a usage profile of the mobile device.

6. The system according to claim 1, wherein the bandwidth adjustment facilitator is arranged to monitor a usage profile of the mobile device and sends a prompt to the mobile device to adjust the data bandwidth according to the usage profile.

7. A system for adjusting an amount of data bandwidth provided to a mobile device comprising:
a bandwidth adjustment facilitator arranged to receive a request from the mobile device for adjusting the amount of data bandwidth; and
a bandwidth throttler in communication with the bandwidth adjustment facilitator, the bandwidth throttler adapted to cap or allocate excess available data bandwidth to the mobile device;
wherein on receipt of the request, the bandwidth adjustment facilitator processes the request and if the request is successfully processed, adjusts the data bandwidth provided to the mobile device via the bandwidth throttler; the data bandwidth is adjustable between two modes comprising a trickle mode where data bandwidth is 9.6 kbps and lower; and a boost mode where data bandwidth is at least 2 Mbps; the bandwidth adjustment facilitator is further arranged to monitor a usage profile of the mobile device and sends a prompt to the mobile device to adjust the data bandwidth according to the usage profile, wherein a usage profile to adjust the data bandwidth to boost mode is based on one or more of the following:

whether the mobile device consumed maximum data bandwidth of a trickle mode for a predetermined period of time; detecting that an active connection is established with a URL/IP address that is known to deliver video, images, or large files for a predetermined period of time;

detecting that a file of a certain type and size is being accessed or downloaded; and detecting that the mobile device uses progressive http download.

8. The system according to claim 1, wherein the bandwidth adjustment facilitator is arranged to check an access point name (APN) of the mobile device prior to processing the request.

9. The system according to claim 1, wherein bandwidth usage is charged or billed based on either a pay-per-specific time model or pay per action model.

10. The system according to claim 9, wherein the pay-per-specific time model or pay per action model is activated by sending a request from the mobile device to the bandwidth adjustment facilitator, the bandwidth adjustment facilitator operable to, upon receiving the request, toggle between an existing billing infrastructure implementing the pay-per-specific time model and an independent billing module implementing the pay per action model.

11. A system for adjusting an amount of data bandwidth provided to a mobile device comprising:
a bandwidth adjustment facilitator arranged to receive a request from the mobile device for adjusting the amount of data bandwidth; and
a bandwidth throttler in communication with the bandwidth adjustment facilitator, the bandwidth throttler adapted to cap or allocate excess available data bandwidth to the mobile device;
wherein on receipt of the request, the bandwidth adjustment facilitator processes the request and if the request is successfully processed, adjusts the data bandwidth provided to the mobile device via the bandwidth throttler; the data bandwidth is adjustable between two modes comprising a trickle mode where data bandwidth is 9.6 kbps and lower; and a boost mode where data bandwidth is at least 2 Mbps; the bandwidth usage is further charged or billed based on either a pay-per-specific time model or pay per action model, wherein the pay-per-specific time model or pay per action model is activated by sending a request from the mobile device to the bandwidth adjustment facilitator, the bandwidth adjustment facilitator operable to, upon receiving the request, toggle between an existing billing infrastructure implementing the pay-per-specific time model and an independent billing module implementing the pay per action model, and
wherein the toggling from the existing billing infrastructure to the independent billing module is achieved either by switching off the existing billing infrastructure; or defining the data bandwidth connection as a zero tariff.

12. A method for adjusting an amount of data bandwidth provided to a mobile device comprising the following steps:
a. receiving at a bandwidth adjustment facilitator from the mobile device a request to adjust bandwidth;
b. processing the request to adjust bandwidth; and c. adjusting the data bandwidth to the mobile device via a bandwidth throttler upon successful processing of the request;

wherein the bandwidth is adjustable to between two modes comprising a trickle mode where data bandwidth is 9.6 kbps and lower; and a boost mode where data bandwidth is at least 2 Mbps.

13. The method according to claim 12, wherein the request for adjusting the amount of data bandwidth is in the form of Short Messaging Service (SMS) message, electronic text message, or Unstructured Supplementary Service Data (USSD) message.

14. The method according to claim 12, wherein the processing step includes checking a subscriber database to determine if the mobile device has a subscriber account and a subscriber type; and checking an accounting database for available of funds to make the adjustment of bandwidth.

15. The method according to claim 12, including a step of checking an access point name (APN) of the mobile device prior to processing the request.

16. The method according to claim 12, the method comprising an additional step of billing for the bandwidth consumed based on either a pay-per-specific time model or pay per action model.

17. The method according to claim 16, wherein the pay-per-specific time model or pay per action model is activated by sending a request from the mobile device to the bandwidth adjustment facilitator, the bandwidth adjustment facilitator operable to, upon receiving the request, toggle between an existing billing infrastructure implementing the pay-per-specific time model and an independent billing module implementing the pay per action model.

18. A mobile device containing software instructions, wherein upon execution of the software instructions performs the method of claim 12 to adjust the data bandwidth.

19. A method for adjusting an amount of data bandwidth provided to a mobile device comprising the following steps:
    a. receiving at a bandwidth adjustment facilitator from the mobile device a request to adjust bandwidth;
    b. processing the request to adjust bandwidth; and
    c. adjusting the data bandwidth to the mobile device via a bandwidth throttler upon successful processing of the request;
    wherein the bandwidth is adjustable to between two modes comprising a trickle mode where data bandwidth is 9.6 kbps and lower; and a boost mode where data bandwidth is at least 2 Mbps; and wherein a default mode of a pre-paid subscriber is the trickle mode.

20. The method according to claim 12, wherein the request is sent automatically to the bandwidth adjustment facilitator based on a usage profile of the mobile device.

21. The method according to claim 12, wherein the bandwidth adjustment facilitator is arranged to monitor a usage profile of the mobile device and sends a prompt to the mobile device to adjust the data bandwidth according to the usage profile.

22. A method for adjusting an amount of data bandwidth provided to a mobile device comprising the following steps:
    a. receiving at a bandwidth adjustment facilitator from the mobile device a request to adjust bandwidth;
    b. processing the request to adjust bandwidth; and
    c. adjusting the data bandwidth to the mobile device via a bandwidth throttler upon successful processing of the request;
    wherein the bandwidth is adjustable to between two modes comprising a trickle mode where data bandwidth is 9.6 kbps and lower; and a boost mode where data bandwidth is at least 2 Mbps; the bandwidth adjustment facilitator is further arranged to monitor a usage profile of the mobile device and sends a prompt to the mobile device to adjust the data bandwidth according to the usage profile; wherein the monitoring of the usage profile is based on one or more of the following:
    whether the mobile device consumed maximum data bandwidth of a trickle mode for a predetermined period of time;
    detecting that an active connection is established with a URL/IP address that is known to deliver video, images, or large files for a predetermined period of time;
    detecting that a file of a certain type and size is being accessed or downloaded; and
    detecting that the mobile device uses progressive http download.

23. A method for adjusting an amount of data bandwidth provided to a mobile device comprising the following steps:
    a. receiving at a bandwidth adjustment facilitator from the mobile device a request to adjust bandwidth;
    b. processing the request to adjust bandwidth;
    c. adjusting the data bandwidth to the mobile device via a bandwidth throttler upon successful processing of the request; wherein the bandwidth is adjustable to between two modes comprising a trickle mode where data bandwidth is 9.6 kbps and lower; and a boost mode where data bandwidth is at least 2 Mbps; and
    d. billing for the bandwidth consumed based on either a pay-per-specific time model or pay per action model, wherein the pay-per-specific time model or pay per action model is activated by sending a request from the mobile device to the bandwidth adjustment facilitator, the bandwidth adjustment facilitator operable to, upon receiving the request, toggle between an existing billing infrastructure implementing the pay-per-specific time model and an independent billing module implementing the pay per action model; the toggling from the existing billing infrastructure to the independent billing module is achieved either by switching off the existing billing infrastructure; or defining the data bandwidth connection as a zero tariff.

24. A mobile device containing software instructions, wherein upon execution of the software instructions performs a method of adjusting the amount of data bandwidth provided to a mobile device comprising the following steps:
    a. receiving at a bandwidth adjustment facilitator from the mobile device a request to adjust bandwidth;
    b. processing the request to adjust bandwidth; and
    c. adjusting the data bandwidth to the mobile device via a bandwidth throttler upon successful processing of the request;
    wherein the bandwidth is adjustable to between two modes comprising a trickle mode where data bandwidth is 9.6 kbps and lower; and a boost mode where data bandwidth is at least 2 Mbps;
    wherein the software instructions includes monitoring a usage profile based on one or more of the following:
    whether the mobile device consumed maximum data bandwidth of a trickle mode for a predetermined period of time;
    detecting that an active connection is established with a URL/IP address that is known to deliver video, images, or large files for a predetermined period of time;
    detecting that a file of a certain type and size is being accessed or downloaded; and
    detecting that the mobile device uses progressive http download.

25. A mobile device containing software instructions, wherein upon execution of the software instructions performs a method of adjusting the amount of data bandwidth provided to a mobile device comprising the following steps:
   a. receiving at a bandwidth adjustment facilitator from the mobile device a request to adjust bandwidth;
   b. processing the request to adjust bandwidth; and
   c. adjusting the data bandwidth to the mobile device via a bandwidth throttler upon successful processing of the request;
   wherein the bandwidth is adjustable to between two modes comprising a trickle mode where data bandwidth is 9.6 kbps and lower; and a boost mode where data bandwidth is at least 2 Mbps; wherein the method comprises an additional step of billing for the bandwidth consumed based on either a pay-per-specific time model or pay per action model, wherein the pay-per-specific time model or pay per action model is activated by sending a request from the mobile device to the bandwidth adjustment facilitator, the bandwidth adjustment facilitator operable to, upon receiving the request, toggle between an existing billing infrastructure implementing the pay-per-specific time model and an independent billing module implementing the pay per action model.

* * * * *